(12) United States Patent
Walker et al.

(10) Patent No.: US 6,857,600 B1
(45) Date of Patent: Feb. 22, 2005

(54) INFRARED SUPPRESSING TWO DIMENSIONAL VECTORABLE SINGLE EXPANSION RAMP NOZZLE

(75) Inventors: Alan Richard Walker, Louisville, KY (US); William Harvey Wooten, Jr., Cincinnati, OH (US); William Van Sutherland, Milford, OH (US); Joseph Holowach, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 413 days.

(21) Appl. No.: 10/133,077

(22) Filed: Apr. 26, 2002

(51) Int. Cl.[7] .............................................. F02K 1/06
(52) U.S. Cl. .................... 244/73 R; 60/230; 239/265.35
(58) Field of Search ............... 244/73 R, 74, 244/62; 239/265.35, 265.37, 265.39, 265.41; 60/229, 230, 232

(56) References Cited

U.S. PATENT DOCUMENTS

| | | | |
|---|---|---|---|
| 3,841,091 A | | 10/1974 | Sargisson et al. |
| 3,986,687 A | | 10/1976 | Beavers et al. |
| 4,000,610 A | | 1/1977 | Nash et al. |
| 4,000,854 A | | 1/1977 | Konarski et al. |
| 4,280,660 A | | 7/1981 | Wooten, Jr. et al. |
| 4,375,276 A | * | 3/1983 | Konarski ............... 239/265.29 |
| 4,392,615 A | | 7/1983 | Madden |
| 4,502,638 A | | 3/1985 | Szuminski et al. |

(List continued on next page.)

OTHER PUBLICATIONS

AIAA' 88, AIAA-88-3000, "Vectoring Single Expansion Ramp Nozzle (VSERN) Static Model Test Program", D.J.H. Eames, Rolls-Royce Inc., Atlanta, GA; and M.L. Mason, NASA Langley Research Center, Hampton, VA, AIAA/ ASME/SAE/ASEE 24th Joint Propulsion Conference, Jul. 11–13, 1988 / Boston, Massachusetts, 13 pages.

AIAA' 84, AIAA–84–2455, "Single Expansion Ramp Nozzle Development Status", D.J. Dusa and W.H. Wooten, General Electric Company, Cincinnati, Ohio, AIAA/AHS/ ASEE Aircraft Design Systems and Operations Meeting, Oct. 31 –Nov. 2, 1984 / San Diego, California, 9 pages.

AIAA, AIAA 93–2429, "Static Internal Performance Tests of Single Expansion Ramp Nozzle Concepts Designed with LO Considerations", M.K. MacLean, GE Aircraft Engines, Cincinnati, Ohio, AIAA/SAE/ASME/ASEE 29th Joint Propulsion Conference and Exhibit, Jun. 28–30, 1993 / Monterey, CA, 13 pages.

NASA/TP–1999–209138, "Experimental and Computational Investigation of a Transplanting–Throat, Single–Expansion Ramp Nozzle", Karen A. Deere and Scott C. Asbury, Langley Research Center, Hampton, Virginia, May 1999, 32 pages.

*Primary Examiner*—Michael J. Carone
*Assistant Examiner*—Gabriel Sukman
(74) *Attorney, Agent, or Firm*—William Scott Andes; Steven J. Rosen (57) ABSTRACT

A two dimensional gas turbine engine exhaust nozzle includes transversely spaced apart upper and lower convergent and divergent flaps and extending longitudinally in a downstream direction and between two widthwise spaced apart sidewalls. The divergent flaps have inwardly facing upper and lower flap surfaces defining together with the sidewalls at least a part of an exhaust stream flowpath therebetween. The upper and lower flap surfaces have respective upper and lower apexes wherein the upper apex is axially spaced apart and aft of the lower apex. The upper divergent flap has an expansion ramp diverging away from the nozzle axis. The ramp extends aftwardly from the upper apex and aftwardly of a trailing edge of the lower divergent flap. The upper and lower divergent flaps are operably movable to block a line of sight along the nozzle axis through an exit of the nozzle during engine operation.

39 Claims, 4 Drawing Sheets

U.S. PATENT DOCUMENTS

| | | | |
|---|---|---|---|
| 4,587,806 A | | 5/1986 | Madden |
| 4,641,782 A | * | 2/1987 | Woodward ............ 239/265.29 |
| 4,714,197 A | | 12/1987 | Thayer et al. |
| 4,739,932 A | | 4/1988 | Szuminski et al. |
| 4,763,840 A | * | 8/1988 | Madden ................ 239/265.35 |
| 4,778,109 A | * | 10/1988 | Jourdain et al. ....... 239/265.27 |
| 4,819,876 A | * | 4/1989 | Thayer ................. 239/265.39 |
| 4,833,881 A | | 5/1989 | Vdoviak et al. |
| 4,978,071 A | | 12/1990 | MacLean et al. |
| 5,016,818 A | * | 5/1991 | Nash et al. ............. 239/127.1 |
| 5,081,835 A | | 1/1992 | Ewing, Jr. |
| 5,094,070 A | * | 3/1992 | Enderle ....................... 60/224 |
| 5,186,390 A | | 2/1993 | Enderle et al. |
| 5,261,604 A | * | 11/1993 | Meyer .................. 239/265.19 |
| 5,687,907 A | * | 11/1997 | Holden ................. 239/265.35 |
| 5,690,280 A | | 11/1997 | Holowach et al. |
| 5,699,966 A | | 12/1997 | Beverage |
| 5,706,650 A | | 1/1998 | Thayer |
| 5,833,139 A | | 11/1998 | Sondee et al. |
| 6,000,635 A | | 12/1999 | Justice |
| 6,021,637 A | | 2/2000 | Scavo |
| 6,352,211 B1 | | 3/2002 | Bentley |

\* cited by examiner

INFRARED SUPPRESSING TWO DIMENSIONAL VECTORABLE SINGLE EXPANSION RAMP NOZZLE

BACKGROUND OF THE INVENTION

Field of the Invention

The invention relates to aircraft gas turbine engine two dimensional vectoring nozzles and, particularly, for such nozzles designed to block line of sight through the nozzle's exit.

High performance military aircraft typically include a turbofan gas turbine engine having an afterburner or augmenter for providing additional thrust when desired and some are being developed with two dimensional vectorable nozzles. The turbofan engine includes in downstream serial flow communication, a multistage fan, a multistage compressor, a combustor, a high pressure turbine powering the compressor, a low pressure turbine powering the fan, and the nozzle. During operation, air is compressed in turn through the fan and compressor and mixed with fuel in the combustor and ignited for generating hot combustion gases which flow downstream through the turbine stages which extract energy therefrom. The hot core gases are then discharged into an exhaust section of the engine which includes an augmenter from which they are discharged from the engine through the nozzle which is also typically variable area exhaust nozzle.

One type of two dimensional nozzle is a single expansion ramp nozzle referred to as a SERN nozzle. SERN was developed as a variable area non-axisymmetric nozzle with a unique installed performance characteristic of low weight and frictional drag because there is no or a smaller lower cowl. Low observable (LO) exhaust nozzle technology is being developed for current and future fighter/attack aircraft. LO nozzles should be integrated cleanly with the aircraft airframe and not degrade the aircraft's performance due to weight and drag penalties. Exhaust systems for combat aircraft should possess characteristics to enhance aircraft survivability, including high internal performance, reduced radar cross section (RCS), low infrared (IR) signatures, low installed weight, low installation drag and, in some cases, thrust-vectoring capabilities.

Two dimensional nozzles have been developed for the purpose of accomplishing thrust vectoring. Two dimensional vectorable exhaust nozzles incorporate upper and lower flaps that are angled simultaneously for the purpose of deflecting exhaust gas in an upward or downward direction. Increasing the angle of the flaps increases the amount of turning that is imparted to the exhaust gas flow.

The augmenter includes an exhaust casing and liner therein which defines a combustion zone. Fuel spraybars and flameholders are mounted between the turbines and the exhaust nozzle for injecting additional fuel when desired during reheat operation for burning in the augmenter for producing additional thrust. In a bypass turbofan engine, an annular bypass duct extends from the fan to the augmenter for bypassing a portion of the fan air around the core engine to the augmenter. The bypass air is used in part for cooling the exhaust liner and also is mixed with the core gases prior to discharge through the exhaust nozzle. Turbojets, engines without bypass ducts may also use augmenters and variable area two dimensional nozzles.

Various types of flameholders are known and typically include radial and circumferential V-shaped gutters which provide local low velocity recirculation and stagnation regions therebehind, in otherwise high velocity core gas flow, for sustaining combustion during reheat operation. Since the core gases are the product of combustion in the core engine, they are initially hot when they leave the turbine, and are further heated when burned with the bypass air and additional fuel during reheat operation.

The hot parts of the engine visible along lines of sight through the exhaust nozzle produce an infrared signal or signature. The rotating turbine has a radar detectable signature or radar cross section (RCS). This invention relates to apparatus for reducing the engine's radar cross-section and suppressing and masking infrared (IR) emissions through engine exhaust ducts particularly those due to turbine and augmenter parts. Successful operation of combat aircraft is dependent, in part, upon the ability of the aircraft to remain undetected by infrared sensors and radars of missiles during flight. The high temperatures of the engine's exhaust gases and the hot metal turbine parts and the hot metal walls directly in contact with the hot gases cause the engine to emit high levels of infrared energy. Military aircraft engaged in combat are vulnerable to anti-aircraft missiles employing highly sophisticated infrared sensors and radar.

SUMMARY OF THE INVENTION

A two dimensional gas turbine engine exhaust nozzle includes transversely spaced apart upper and lower convergent and divergent flaps extending longitudinally in a downstream direction along a nozzle axis and disposed between two widthwise spaced apart sidewalls. The upper and lower divergent flaps have inwardly facing upper and lower flap surfaces defining together with the sidewalls at least a part of an exhaust stream flowpath therebetween. The upper and lower flap surfaces have respective upper and lower apexes wherein the upper apex is axially spaced apart and aft of the lower apex. The upper divergent flap has an expansion ramp diverging away from the nozzle axis and includes a ramp section of the upper flap surface that extends aftwardly from the upper apex and aftwardly of a trailing edge of the lower divergent flap. The exemplary embodiment of the nozzle further includes transversely spaced apart upper and lower convergent and divergent flap axes extending widthwise between the sidewalls wherein the upper convergent and divergent flaps are rotatable about the upper convergent and divergent flap axes and the lower convergent and divergent flaps are rotatable about the lower convergent and divergent flap axes, respectively.

In a more particular embodiment of the invention, the upper and lower divergent flaps are rotatably attached to downstream ends of the upper and lower convergent flaps along the upper and lower divergent flap axes, respectively. The upper and lower divergent flaps are operably rotatable to angularly vector an exhaust flow aft of the apexes upwardly and downwardly with respect to the nozzle axis. The divergent flaps are operably movable to block a line of sight along the nozzle axis through an exit of the nozzle during engine operation. The divergent flaps may be positioned to block a range of lines of sight through the nozzle exit at acute angles to the nozzle axis. A throat extends generally transversely across the exhaust stream flowpath between a first position on the lower apex to a second position on the upper divergent flap downstream of the upper flap axis. The upper divergent flap is generally convex and the lower divergent flap is generally concave between the upper and lower apexes, respectively. The exhaust stream flowpath diverges in the downstream direction between the lower apex and the upper apex. A more particular embodiment of the invention includes an air flow injection means for injecting air through air injection apertures in at least one of the upper and lower divergent flaps and the sidewalls. The air flow injection means includes at least one row of the air injection apertures in each of the upper and lower divergent flaps and the sidewalls. The air injection apertures may be located in at least one plane normal to a direction of exhaust flow in the exhaust stream flowpath along the upper apex.

The exemplary embodiment of the invention further includes, extending longitudinally in a downstream direction along a nozzle axis and in downstream serial flow relationship, a convergent section and a divergent section and a throat therebetween. The convergent section includes, in downstream serial flow relationship, transversely spaced apart upper and lower convergent non-rotatable walls, rotatable upper and lower reverser doors, and the upper and lower convergent flaps extending longitudinally in the downstream direction along the nozzle axis and disposed between the two widthwise spaced apart sidewalls. Transversely spaced apart upper and lower reverser door axes extend widthwise between the sidewalls wherein the upper and lower reverser doors are rotatable about the upper and lower reverser door axes, respectively. The upper and lower reverser doors rotatably open to upper and lower reverse air flow passages angled in an upstream direction from the exhaust stream flowpath to outside of the nozzle.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
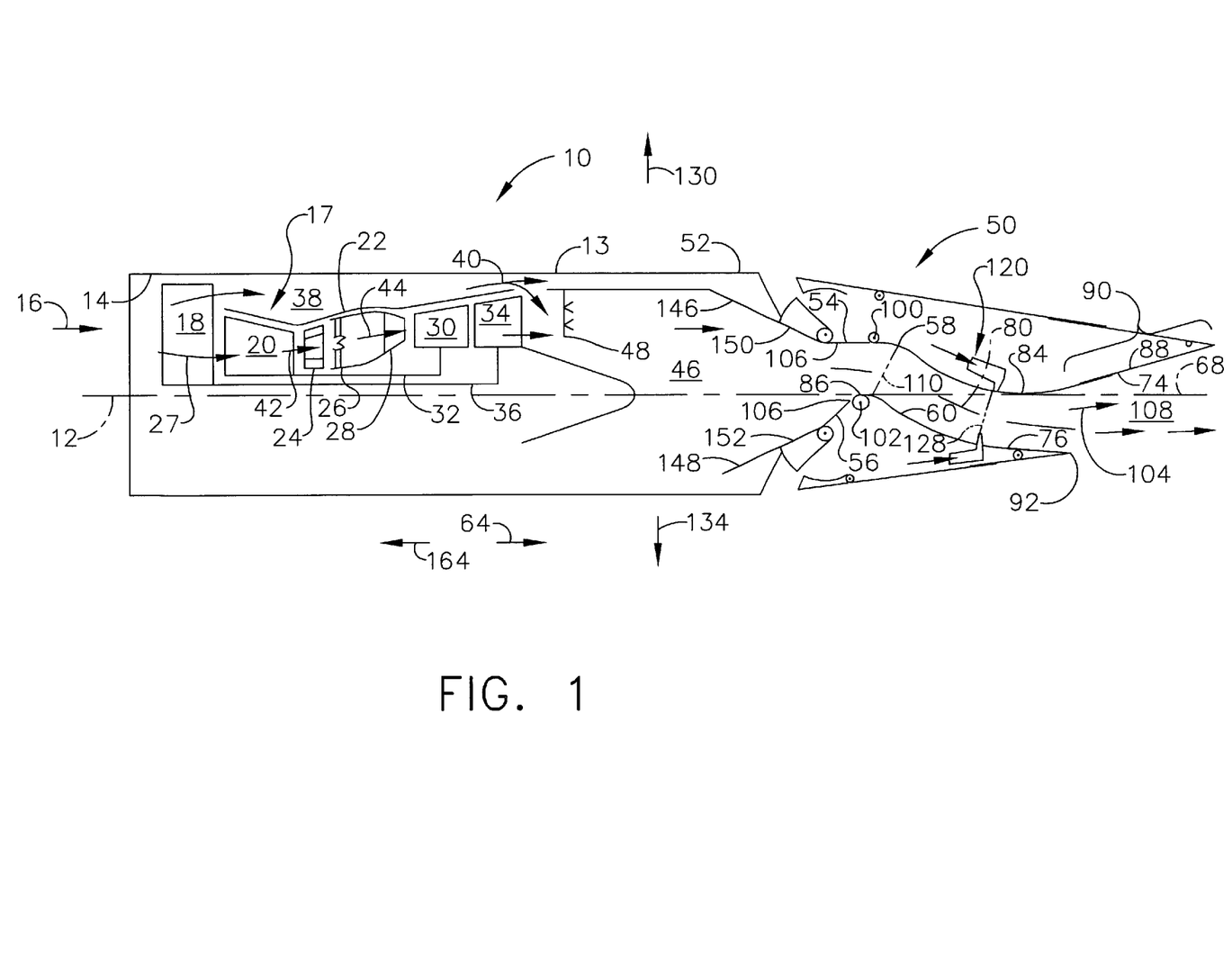
FIG. 1 is a longitudinal sectional view illustration of exemplary embodiment of an aircraft gas turbine engine with a single expansion ramp nozzle having axially offset upper and lower apexes of upper and lower nozzle flaps respectively.

Illustrated in FIG. 1 is an exemplary gas turbofan engine 10 having an engine casing 13, of the fan bypass air type, including an exemplary embodiment of a two dimensional single expansion ramp exhaust nozzle 50 of the present invention. Disposed concentrically about a longitudinal centerline axis 12 of the engine 10, within the engine casing 13 is a core engine 17. The core engine 17 includes, in serial flow communication, an inlet 14 for receiving ambient air 16, a fan 18, and a high pressure compressor (HPC) 20 disposed within an annular core engine casing 22.

The core engine 17 further includes a diffuser 24 and a combustor 26 disposed in downstream serial flow communication with the HPC 20. The core engine 17 further includes, disposed in downstream serial flow communication with the combustor 26, a high pressure (HP) turbine nozzle 28 followed by a high pressure turbine (HPT) 30 for powering the HPC 20 through a HP shaft 32 extending therebetween. Downstream of the core engine 17 is a low pressure turbine (LPT) 34 that is in flow communication with the HPT 30 for powering the fan 18 through a LP shaft 36 extending therebetween.

The core engine casing 22 extends from the HPC 20 to the LPT 34 and is surrounded by a conventional bypass duct 38 for channeling a bypass portion of the ambient air 16 compressed in the fan 18 as bypass air 40. A core portion 27 of the air 16 which is not bypassed, is channeled into the HPC 20 which generates compressed airflow 42 which is discharged from the HPC 20 into the diffuser 24. The compressed airflow 42 is mixed with fuel and combusted in the combustor 26 for generating combustion gases 44 which are channeled through the HPT 30 and the LPT 34 and discharged into an afterburner or augmentor 46 located downstream of the LPT 34.

In a dry mode of operation, the augmentor 46 is not used and the combustion gases 44 are channeled therethrough. In a wet mode of operation, additional fuel is mixed with the combustion gases 44 and the bypass air 40 in a fuel injector and flameholder assembly 48 and ignited for generating additional thrust from the engine 10. The combustion gases 44 are discharged from the engine 10 through the exhaust nozzle 50. The nozzle 50 is suitably attached to a downstream end 52 of the engine casing 13 to transfer thrust generated by the nozzle to the engine 10.

Figure 2:
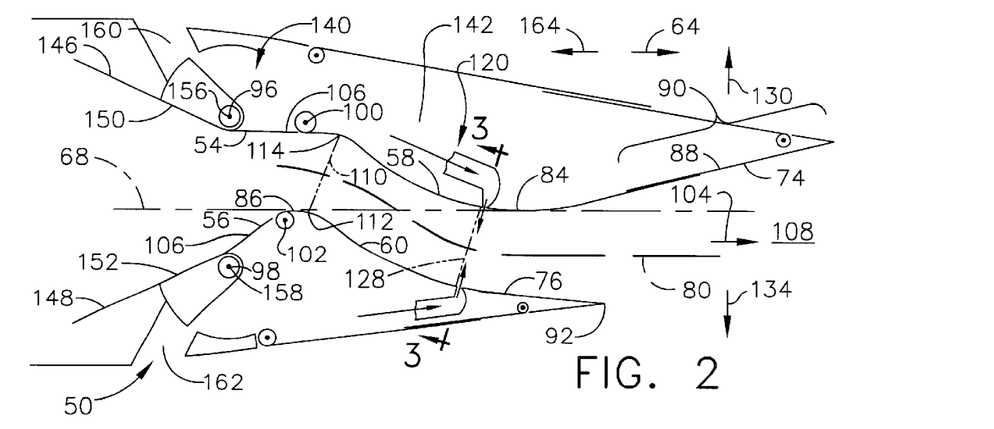
FIG. 2 is an enlarged longitudinal sectional view illustration of the nozzle in FIG. 1.

FIG. 2 illustrates an exemplary embodiment of the nozzle 50 which is a convergent divergent two dimensional gas turbine engine exhaust nozzle. The nozzle 50 includes transversely spaced apart upper and lower convergent flaps 54 and 56 and transversely spaced apart upper and lower divergent flaps 58 and 60, respectively, extending longitudinally in a downstream direction 64 along a nozzle axis 68 and disposed between two widthwise spaced apart first and second sidewalls 70 and 72 illustrated in FIG. 3. The nozzle axis 68 in the exemplary embodiment is collinear with the longitudinal centerline axis 12 but need not be in other embodiments or applications of the invention.

The invention is described in terms of upper and lower elements and upward and downward directions. This is for purpose of convenience and upper and lower flaps and other elements may be reversed. There are embodiments of the invention wherein the nozzle installation is upside down with respect to the embodiments illustrated in the FIGS. The choice of upper and lower is one of choice for ease of description.

The upper and lower divergent flaps 58 and 60 have inwardly facing upper and lower flap surfaces 74 and 76, respectively, which together with the sidewalls 70 and 72 define, at least a part, an exhaust stream flowpath 80 therebetween. The upper and lower flap surfaces 74 and 76 have respective upper and lower apexes 84 and 86 wherein the upper apex is axially spaced apart and aft of the lower apex. The upper divergent flap 58 has an expansion ramp 88 diverging away from the nozzle axis 68 and includes a ramp section 90 of the upper flap surface 74 that extends aftwardly from the upper apex 84 and aftwardly of a trailing edge 92 of the lower divergent flap 60.

The exemplary embodiment of the nozzle 50 further includes transversely spaced apart upper and lower convergent flap axes 96 and 98 and upper and lower divergent flap axes 100 and 102, respectively, extending widthwise between the sidewalls 70 and 72. The upper and lower convergent flaps 54 and 56 are rotatable about the upper and lower convergent flap axes 96 and 98, respectively. The upper and lower divergent flaps 58 and 60 are rotatable about the upper and lower divergent flap axes 100 and 102, respectively. This provides the nozzle 50 with the ability to vector the thrust of the engine by vectoring an exhaust flow 104 out of the nozzle 50.

In the exemplary embodiment of the invention the upper and lower divergent flaps 58 and 60 are rotatably attached to downstream ends 106 of the upper and lower convergent flaps 54 and 56 along the upper and lower divergent flap axes 100 and 102, respectively. The upper and lower divergent flaps 58 and 60 are operably rotatable to angularly vector the exhaust flow 104 aft of the upper and lower apexes 84 and 86 upwardly 130 and downwardly 134 with respect to the nozzle axis 68. The upper and lower divergent flaps 58 and 60 are movable to block a line of sight along the nozzle axis 68 through a nozzle exit 108 of the nozzle 50 during engine operation. The divergent flaps may be positioned to block a range of lines of sight through the nozzle exit at acute angles to the nozzle axis. A throat 110 extends generally transversely across the exhaust stream flowpath 80 between a first position 112 on the lower apex 86 to a second position 114 on the upper divergent flap 58 upstream of the upper apex 84. The upper divergent flap 58 is generally convex and the lower divergent flap 60 is generally concave between the upper and lower apexes 84 and 86, respectively. The exhaust stream flowpath 80 diverges in the downstream direction 64 between the lower apex 86 and the upper apex 84.

Figure 3:
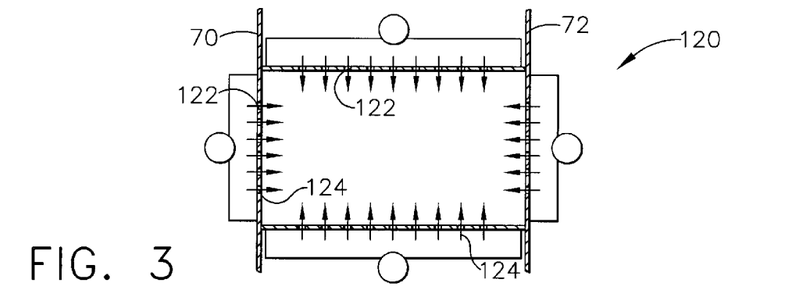
FIG. 3 is an enlarged view illustration of fluidic nozzle injection through 3—3 in FIG. 2.

The nozzle 50 may include an air flow injection means 120 for injecting air through air injection apertures 122 in at least one of the upper and lower divergent flaps 58 and 60 and the sidewalls 70 and 72 as illustrated in FIGS. 1 and 3. This technique is also referred to as fluidic nozzle injection and it is known to use a fluidic nozzle for both pitch and yaw thrust vectoring. The air flow injection means 120 may include at least one row 124 of the air injection apertures 122 in each of the upper and lower divergent flaps 58 and 60 and sidewalls 70 and 72. The air injection apertures 122 may be located in at least one plane 128 normal to the exhaust flow 104 in the exhaust stream flowpath 80 along the upper apex 84 as illustrated herein. Other arrangements of the air injection apertures 122 may include longitudinally and transversely spaced apart arrays of the air injection apertures on one or all of the upper and lower divergent flaps 58 and 60 and the sidewalls 70 and 72.

Figure 6:
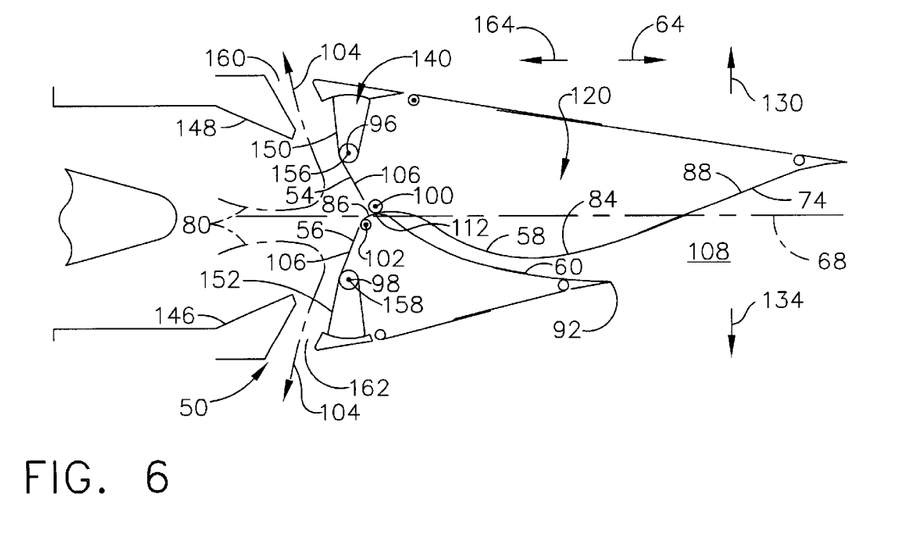
FIG. 6 is a longitudinal sectional view illustration of the nozzle in FIG. 1. configured for thrust reversal.

Referring to FIGS. 1, 2 and 6, the exemplary embodiment of the nozzle 50 further includes, extending longitudinally in the downstream direction 64 along the nozzle axis 68 and in downstream serial flow relationship, a convergent section 140 and a divergent section 142 and the throat 110 therebetween. The convergent section 140 includes, in downstream serial flow relationship, transversely spaced apart upper and lower convergent non-rotatable walls 146 and 148, respectively, upper and lower rotatable reverser doors 150 and 152, respectively, and the upper and lower convergent flaps 54 and 56 extending longitudinally in the downstream direction 64 along the nozzle axis 68 and disposed between the two widthwise spaced apart sidewalls 70 and 72. Transversely spaced apart upper and lower reverser door axes 156 and 158, respectively, extend widthwise between the sidewalls 70 and 72 and the upper and lower reverser doors 150 and 152 are rotatable about the upper and lower reverser door axes, respectively. The upper and lower reverser doors 150 and 152 rotatably open to upper and lower reverse air flow passages 160 and 162, respectively, angled in an upstream direction 164 from the exhaust stream flowpath 80 to outside of the nozzle 50. In the exemplary embodiment of the invention, the upper and lower reverser door axes 156 and 158 are collinear with the upper and lower convergent flap axes 96 and 98.

Figure 4:
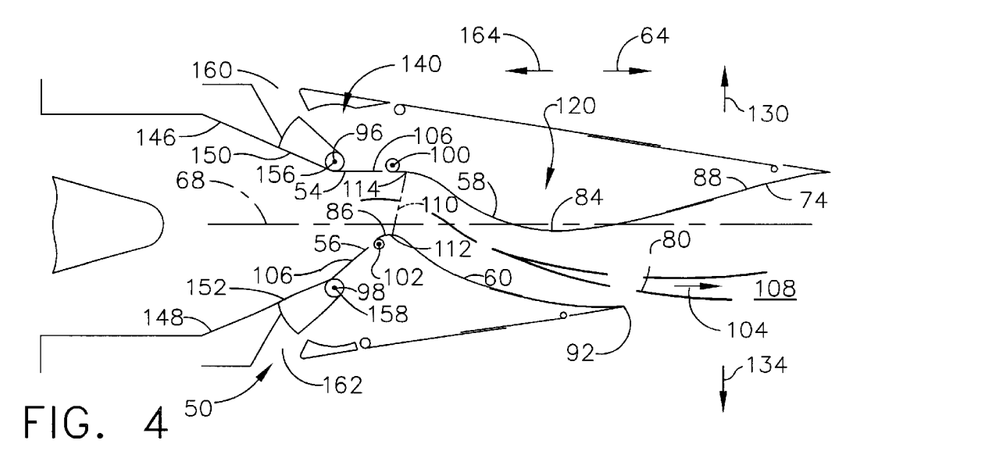
FIG. 4 is a longitudinal sectional view illustration of the nozzle in FIG. 1. configured for cruise.
Figure 5:
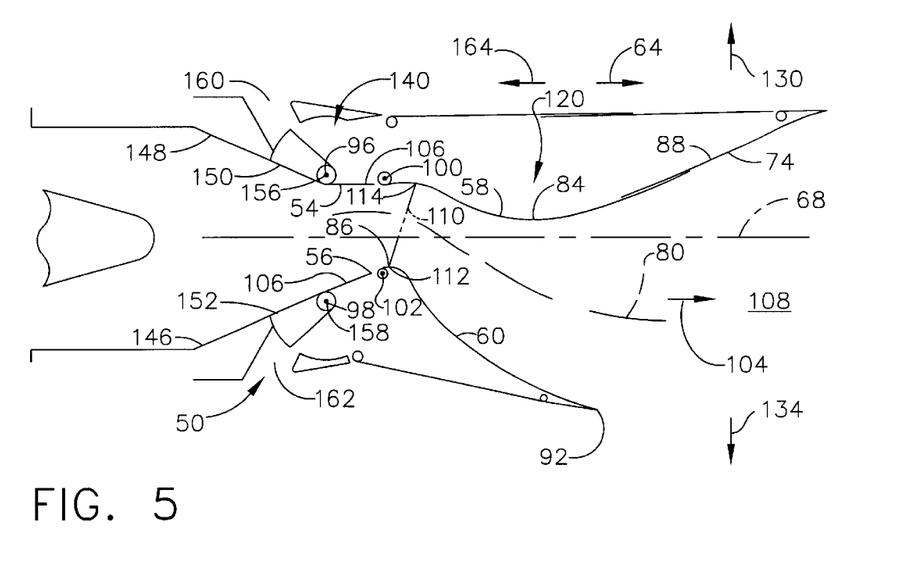
FIG. 5 is a longitudinal sectional view illustration of the nozzle in FIG. 1. configured wide open.
Figure 7:
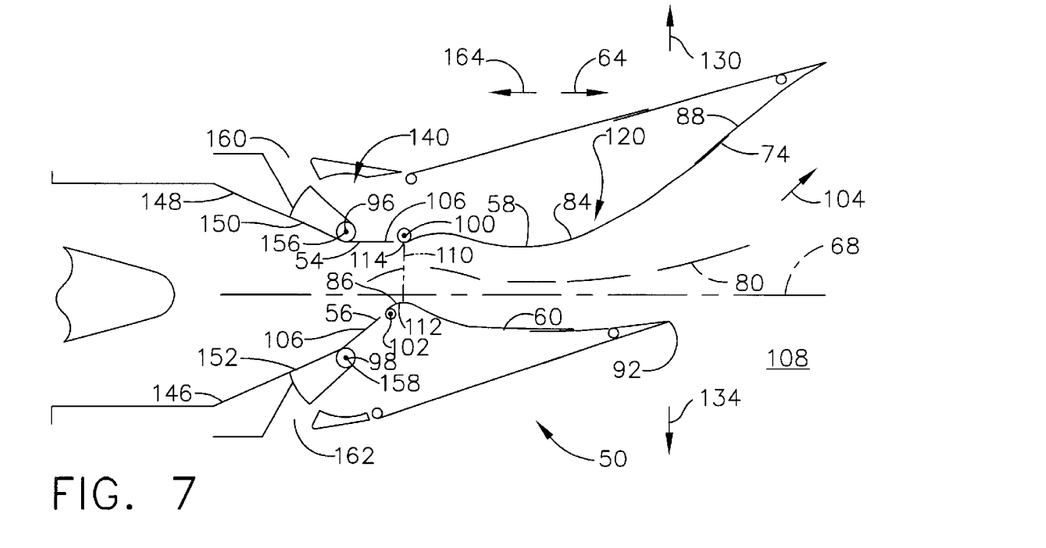
FIG. 7 is a longitudinal sectional view illustration of the nozzle in FIG. 1. configured for thrust vectoring in an upward direction.
Figure 8:
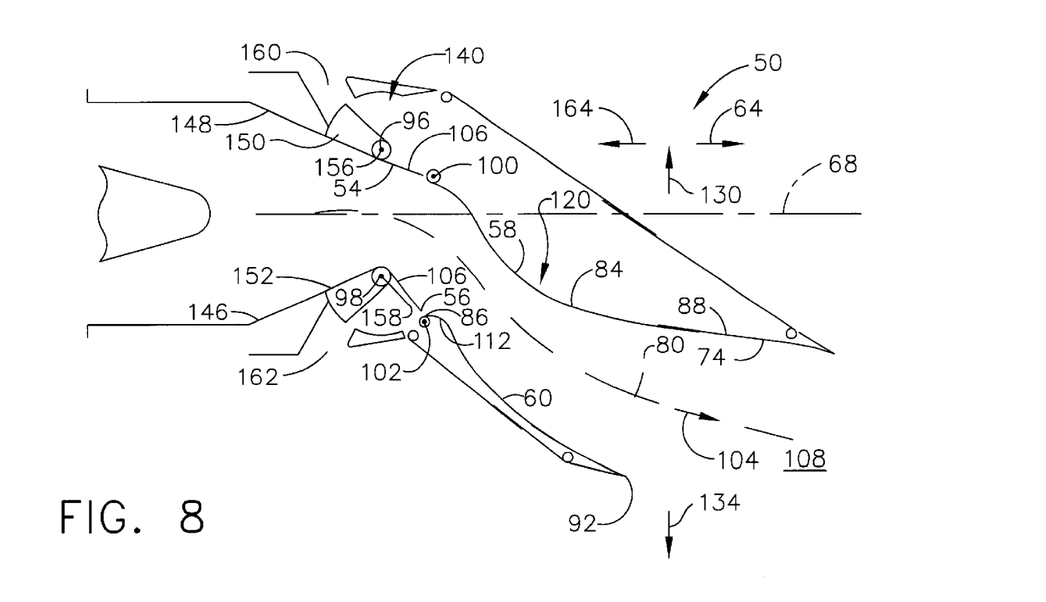
FIG. 8 is a longitudinal sectional view illustration of the nozzle in FIG. 1. configured for thrust vectoring in a downward direction.

FIG. 4 illustrates the nozzle 50 configured for supersonic and subsonic cruise and the upper and lower divergent and convergent flaps 54, 56, 58, 60 are positioned such that the upper and lower apexes 84 and 86 are positioned on the nozzle axis 68 such that the upper and lower divergent flaps 58, 60 block the line of sight along the nozzle axis 68 through the exit 108 of the nozzle 50. FIG. 5 illustrates the nozzle 50 configured wide open as it may be operated during takeoff or for maximum thrust. FIG. 7 illustrates the nozzle 50 configured for pitch thrust vectoring in the upward direction and FIG. 8 illustrates the nozzle 50 configured for pitch thrust vectoring in the downward direction.

FIG. 6 illustrates the nozzle 50 configured for reverse thrust. The upper and lower reverser doors 150 and 152 are illustrated in a rotated open position and the upper and lower reverse air flow passages 160 and 162, respectively, are open. The upper and lower convergent flaps 54 and 56 are in a position rotated towards the nozzle axis 68 so as to close off the exhaust stream flowpath 80 and prevent the exhaust flow 104 to flow out the nozzle exit 108. This causes substantially all of the exhaust flow 104 to flow out the upper and lower reverse air flow passages 160 and 162, thus, providing reverse thrust for the engine 10.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A two dimensional gas turbine engine exhaust nozzle comprising:

transversely spaced apart upper and lower convergent and divergent flaps and extending longitudinally in a downstream direction along a nozzle axis and disposed between two widthwise spaced apart sidewalls, said upper and lower divergent flaps having inwardly facing upper and lower flap surfaces defining together with said sidewalls at least a part of an exhaust stream flowpath therebetween, said upper and lower flap surfaces having respective upper and lower apexes wherein said upper apex is axially spaced apart and aft of said lower apex, and said upper divergent flap having an expansion ramp diverging away from said nozzle axis, including a ramp section of said upper flap surface, extending aftwardly from said upper apex, and extending aftwardly of a trailing edge of said lower divergent flap.

2. A nozzle as claimed in claim 1 further comprising transversely spaced apart upper and lower convergent and divergent flap axes and extending widthwise between said sidewalls wherein said upper convergent and divergent flaps are rotatable about said upper convergent and divergent flap axes and said lower convergent and divergent flaps are rotatable about said lower convergent and divergent flap axes respectively.

3. A nozzle as claimed in claim 2 wherein said upper and lower divergent flaps are rotatably attached to downstream ends of said upper and lower convergent flaps along said upper and lower divergent flap axes respectively.

4. A nozzle as claimed in claim 3 wherein said upper and lower divergent flaps are operably rotatable to angularly vector an exhaust flow aft of said apexes upwardly and downwardly with respect to said nozzle axis.

5. A nozzle as claimed in claim 1 wherein said upper and lower divergent flaps are operably movable to block a line of sight along said nozzle axis through an exit of the nozzle during engine operation.

6. A nozzle as claimed in claim 5 further comprising transversely spaced apart upper and lower convergent and divergent flap axes and extending widthwise between said sidewalls wherein said upper convergent and divergent flaps are rotatable about said upper convergent and divergent flap axes and said lower convergent and divergent flaps are rotatable about said lower convergent and divergent flap axes respectively.

7. A nozzle as claimed in claim 6 wherein said upper and lower divergent flaps are rotatably attached to downstream ends of said upper and lower convergent flaps along said upper and lower divergent flap axes respectively.

8. A nozzle as claimed in claim 7 wherein said upper and lower divergent flaps are operably rotatable to angularly vector an exhaust flow aft of said apexes upwardly and downwardly with respect to said nozzle axis.

9. A nozzle as claimed in claim 3 further comprising a throat extending generally transversely across said exhaust stream flowpath between a first position on said lower apex to a second position on said upper divergent flap downstream of said upper flap axis.

10. A nozzle as claimed in claim 9 wherein said flaps are operably movable to block a line of sight along said nozzle axis through an exit of the nozzle during engine operation.

11. A nozzle as claimed in claim 10 wherein said upper and lower divergent flaps are operably rotatable to angularly vector an exhaust flow aft of said apexes upwardly and downwardly with respect to said nozzle axis.

12. A nozzle as claimed in claim 10 wherein said upper divergent flap is generally convex and said lower divergent flap is generally concave between said upper and lower apexes respectively.

13. A nozzle as claimed in claim 12 wherein said exhaust stream flowpath diverges in said downstream direction between said lower apex and said upper apex.

14. A nozzle as claimed in claim 13 wherein said upper and lower divergent flaps are operably rotatable to angularly vector an exhaust flow aft of said apexes upwardly and downwardly with respect to said nozzle axis.

15. A nozzle as claimed in claim 9 further comprising air flow injection means for injecting air through air injection apertures in at least one of said upper and lower divergent flaps and said sidewalls.

16. A nozzle as claimed in claim 15 wherein said flaps are operably movable to block a line of sight along said nozzle axis through an exit of the nozzle during engine operation.

17. A nozzle as claimed in claim 16 wherein said air flow injection means includes at least one row of said air injection apertures in each of said upper and lower divergent flaps and said sidewalls.

18. A nozzle as claimed in claim 17 wherein said air injection apertures are located in at least one plane normal to an exhaust flow in the exhaust stream flowpath along said upper apex.

19. A nozzle as claimed in claim 16 wherein said upper and lower divergent flaps are operably rotatable to angularly vector an exhaust flow aft of said apexes upwardly and downwardly with respect to said nozzle axis.

20. A nozzle as claimed in claim 19 wherein said upper divergent flap is generally convex and said lower divergent flap is generally concave between said upper and lower apexes respectively.

21. A nozzle as claimed in claim 20 wherein said exhaust stream flowpath diverges in said downstream direction between said lower apex and said upper apex.

22. A two dimensional gas turbine engine exhaust nozzle comprising:

extending longitudinally in a downstream direction along a nozzle axis and in downstream serial flow relationship, a convergent section and a divergent section and a throat therebetween;

said convergent section including in downstream serial flow relationship transversely spaced apart upper and lower convergent non-rotatable walls, rotatable upper and lower reverser doors, and upper and lower convergent flaps extending longitudinally in said downstream direction along said nozzle axis and disposed between two widthwise spaced apart sidewalls;

transversely spaced apart upper and lower reverser door axes extending widthwise between said sidewalls wherein said upper and lower reverser doors are rotatable about said upper and lower reverser door axes respectively and open to upper and lower reverse air flow passages angled in an upstream direction from said exhaust stream flowpath to outside of the nozzle;

said divergent section including upper and lower divergent flaps extending longitudinally in said downstream direction along said nozzle axis and disposed between said two widthwise spaced apart sidewalls;

said upper and lower divergent flaps having inwardly facing upper and lower flap surfaces defining together with said sidewalls at least a part of an exhaust stream flowpath therebetween;

said upper and lower flap surfaces having respective upper and lower apexes wherein said upper apex is axially spaced apart and aft of said lower apex, and said upper divergent flap having an expansion ramp diverging away from said nozzle axis, including a ramp section of said upper wall surface, extending aftwardly from said upper apex, and extending aftwardly of a trailing edge of said lower divergent flap.

23. A nozzle as claimed in claim 22 further comprising transversely spaced apart upper and lower convergent and divergent flap axes and extending widthwise between said sidewalls wherein said upper convergent and divergent flaps are rotatable about said upper convergent and divergent flap axes and said lower convergent and divergent flaps are rotatable about said lower convergent and divergent flap axes respectively.

24. A nozzle as claimed in claim 23 wherein said upper and lower divergent flaps are rotatably attached to downstream ends of said upper and lower convergent flaps along said upper and lower divergent flap axes respectively.

25. A nozzle as claimed in claim 24 wherein said upper and lower divergent flaps are operably rotatable to angularly vector an exhaust flow aft of said apexes upwardly and downwardly with respect to said nozzle axis.

26. A nozzle as claimed in claim 22 wherein said flaps are operably movable to block a line of sight along said nozzle axis through an exit of the nozzle during engine operation.

27. A nozzle as claimed in claim 26 further comprising transversely spaced apart upper and lower convergent and divergent flap axes and extending widthwise between said sidewalls wherein said upper convergent and divergent flaps are rotatable about said upper convergent and divergent flap axes and said lower convergent and divergent flaps are rotatable about said lower convergent and divergent flap axes respectively.

28. A nozzle as claimed in claim 27 wherein said upper and lower divergent flaps are rotatably attached to downstream ends of said upper and lower convergent flaps along said upper and lower divergent flap axes respectively.

29. A nozzle as claimed in claim 28 wherein said upper and lower divergent flaps are operably rotatable to angularly vector an exhaust flow aft of said apexes upwardly and downwardly with respect to said nozzle axis.

30. A nozzle as claimed in claim 24 further comprising a throat extending generally transversely across said exhaust stream flowpath between a first position on said lower apex to a second position on said upper divergent flap downstream of said upper flap axis.

31. A nozzle as claimed in claim 30 wherein said flaps are operably movable to block a line of sight along said nozzle axis through an exit of the nozzle during engine operation.

32. A nozzle as claimed in claim 31 wherein said upper and lower divergent flaps are operably rotatable to angularly vector an exhaust flow aft of said apexes upwardly and downwardly with respect to said nozzle axis.

33. A nozzle as claimed in claim 31 wherein said upper divergent flap is generally convex and said lower divergent flap is generally concave between said upper and lower apexes respectively.

34. A nozzle as claimed in claim 33 wherein said exhaust stream flowpath diverges in said downstream direction between said lower apex and said upper apex.

35. A nozzle as claimed in claim 34 wherein said upper and lower divergent flaps are operably rotatable to angularly vector an exhaust flow aft of said apexes upwardly and downwardly with respect to said nozzle axis.

36. A nozzle as claimed in claim 35 further comprising air flow injection means for injecting air through air injection apertures in at least one of said upper and lower divergent flaps and said sidewalls.

37. A nozzle as claimed in claim 36 wherein said flaps are operably movable to block a line of sight along said nozzle axis through an exit of the nozzle during engine operation.

38. A nozzle as claimed in claim 37 wherein said air flow injection means includes at least one row of said air injection apertures in each of said upper and lower divergent flaps and said sidewalls.

39. A nozzle as claimed in claim 38 wherein said air injection apertures are located in at least one plane normal to the exhaust flow in the exhaust stream flowpath along said upper apex.

* * * * *